United States Patent [19]

Matsuhashi et al.

[11] Patent Number: 5,030,282
[45] Date of Patent: Jul. 9, 1991

[54] CARBON FIBER-REINFORCED CEMENTITIOUS COMPOSITE AND METHOD FOR PRODUCING THE COMPOSITE

[75] Inventors: Toshikazu Matsuhashi, Kanagawa; Kuniomi Suzuki, Tokyo; Kazuhisa Saito, Shizuoka; Hiroyasu Ogawa, Shizuoka; Masahide Aga, Tokyo; Teruo Yamamiya, Kanagawa; Kenji Sugimoto, Kanagawa; Yutaka Tsuruta, Ciba, all of Japan

[73] Assignees: Toho Rayon Co., Ltd.; Taisei Corporation, both of Tokyo, Japan

[21] Appl. No.: 377,737

[22] Filed: Jul. 10, 1989

Related U.S. Application Data

[63] Continuation of Ser. No. 61,640, Jun. 15, 1987, abandoned.

[30] Foreign Application Priority Data

Jun. 14, 1986 [JP] Japan ................................. 61-138483

[51] Int. Cl.⁵ ............................ C04B 7/02; C04B 7/35
[52] U.S. Cl. ..................................... 106/692; 106/695; 106/717; 106/789; 106/814; 428/367; 428/372; 428/294; 428/297; 428/408; 428/283; 524/5
[58] Field of Search ............... 428/367, 372, 408, 288, 428/294, 297, 283; 106/99, 85, 104, 98

[56] References Cited

U.S. PATENT DOCUMENTS

| | | | |
|---|---|---|---|
| 3,661,604 | 5/1972 | Artmann | 106/98 |
| 3,834,916 | 9/1974 | Kesler | 106/99 |
| 4,111,710 | 9/1978 | David et al. | 106/99 X |
| 4,240,840 | 12/1980 | Downing et al. | 106/99 X |
| 4,302,414 | 11/1981 | Curnow et al. | 106/99 X |
| 4,316,925 | 2/1982 | Delmonte | 428/245 X |
| 4,446,091 | 5/1984 | Pairaudeau et al. | 264/333 X |
| 4,528,238 | 7/1985 | Alford | 428/246 |
| 4,609,540 | 9/1986 | Izumi et al. | 264/29.2 X |
| 4,671,950 | 6/1987 | Ogawa et al. | 264/29.2 X |
| 4,695,415 | 9/1987 | Setsuie et al. | 264/29.2 |

FOREIGN PATENT DOCUMENTS 0021681 1/1978 European Pat. Off. .

OTHER PUBLICATIONS

Briggs, A., Journal of Materials Science 12:384-404 (1977).

Primary Examiner—Lorraine T. Kendell
Attorney, Agent, or Firm—Sughrue, Mion, Zinn, Macpeak & Seas

[57] ABSTRACT

A carbon fiber-reinforced cementitious composite having high strength, which comprises continuous carbon fibers and a cured cement composition, comprising cement particles having an average particle size up to about the average diameter of the carbon fibers, the cured cement composition being substantially interposed between the individual carbon fibers; and a method for producing it.

21 Claims, 1 Drawing Sheet

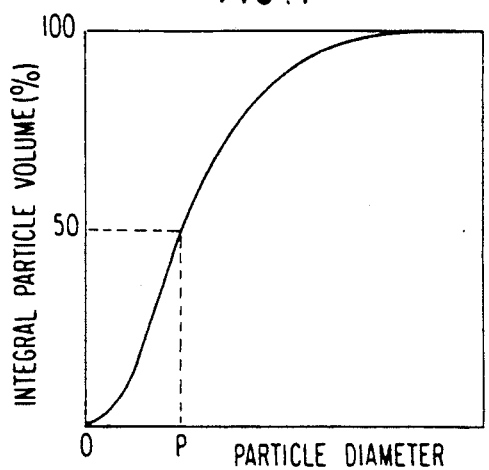
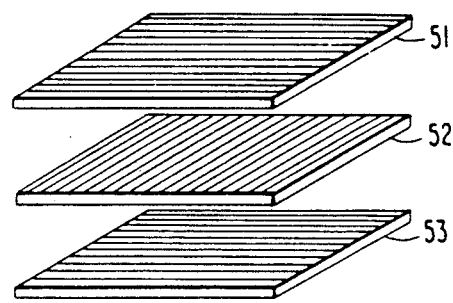
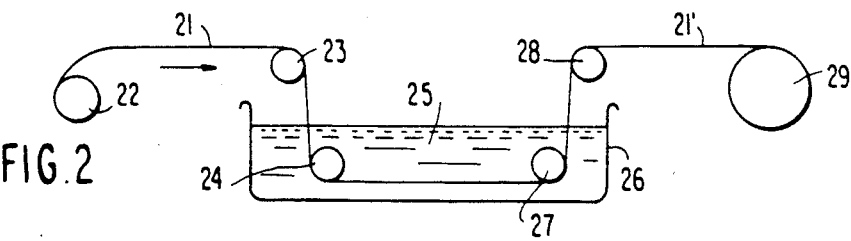
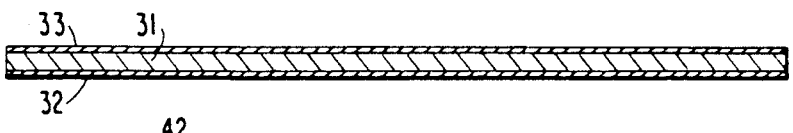
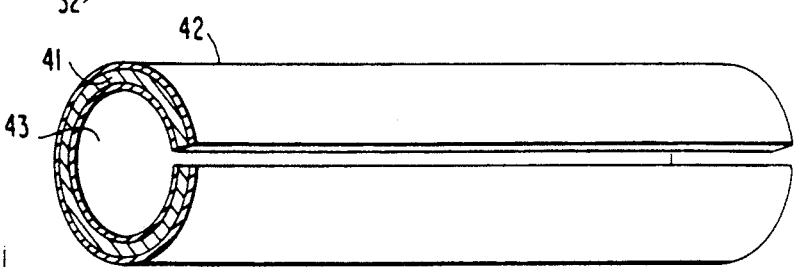
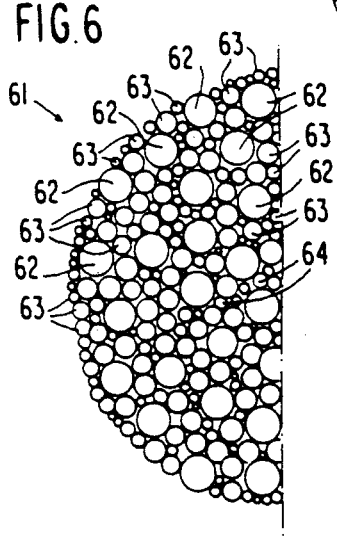
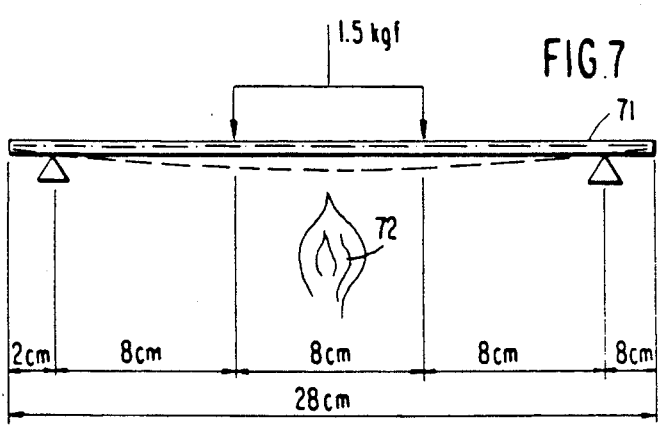

CARBON FIBER-REINFORCED CEMENTITIOUS COMPOSITE AND METHOD FOR PRODUCING THE COMPOSITE

This is a continuation of application Ser. No. 07/061,640, filed June 15, 1987, and now abandoned.

FIELD OF THE INVENTION

This invention relates to a high-strength cementitious composite composed of continuous carbon fibers and a cured cement composition, and more particularly to a composite having a light weight, corrosion resistance, alkali resistance, self-moisture conditioning properties, moisture permeability, electrical conductivity, electrical radiation shielding properties, dimensional stability, cuttability, capability of generating heat by electricity, and low thermal conductivity, non-combustibility, and flame resistance, as well as high strength.

BACKGROUND OF THE INVENTION

Molded products obtained from carbon fibers, a cement, and water have been developed in an attempt to reinforce composites comprising a cured cement composition as a matrix, such as mortar and concrete, by taking advantage of the tensile strength and elasticity of carbon fibres. These molded products have been conventionally obtained by mixing short carbon fibers with a cement and water, and an additional aggregate and/or various admixtures for cement, if desired, and curing the resulting composition.

Since carbon fibers are readily broken during kneading due to their high modulus of elasticity and poor flexing characteristics, improvements have been proposed to prevent breakage by using aggregates of a spherical shape, incorporating air or polymers to the system, and the like. However, the amount of carbon fibers which can be incorporated according to these proposals is only about 5% by volume at the most. Several improvements on these techniques have been reported. For example, the use of cement having a maximum particle size of 45 μm or smaller produces good results, or addition of ultrafine silica having latent hydraulic properties and having an average particle size of about 0.1 μm to common portland cement produces good results. However, sufficient attention has not been paid to the fact that carbon fibers have poor resistance to flexing, so that the straightness of carbon fibers and uniform dispersion of the carbon fibers in the cured cement matrix have not been assured, and the reinforcing effect of carbon fibers has been insufficient. Further, the addition of ultrafine powders of silica is intended to fill spaces among cement particles or between fibers and cement particles, thereby to ensure adhesion between the fibers and the matrix. However, the reaction of the ultrafine silica is a Pozzolanic reaction and the adhesive force produced thereby is limited and insufficient.

Methods of impregnating a cement composition into continuous fibers include the techniques known for molding glass fiber-reinforced plastics, such as hand lay-up, filament winding, pull-pressing, etc. According to these techniques, common portland cement or portland cement having a slightly smaller particle size (e.g., an average particle diameter of 20 μm) is used without special attention to the particle size, As a result, the amount of carbon fibers which can be incorporated is about 10% by volume at the highest. Besides, although the carbon fibers incorporated by these methods are unidirectionally oriented, microscopic straightness of the carbon fibers and dispersibility of individual fibers are not assured so that the reinforcing effect of the carbon fibers is incomplete. In addition, the cement particles are not sufficiently embedded in gaps between carbon fibers because they have a large average particle size as described above, thus resulting in insufficient binding between the carbon fibers and the cement.

Another proposal suggests using carbon fibers in the form of a mat or cloth and molding with a cement and various additives for cement. This technique involves similar problems to those described above and, also, the amount of the carbon fibers to be incorporated thereby does not exceed 5% by volume. Therefore, the strength of the resulting composite material is limited.

SUMMARY OF THE INVENTION

An object of this invention is to provide a cementitious composite containing carbon fiber and exhibiting not only strength ascribed to the carbon fibers but other performance properties, in which cement particles are sufficiently filled in gaps among individual continuous carbon fibers to be firmly bound to the carbon fibers.

In light of the aforesaid problems associated with conventional techniques, the inventors have conducted extensive investigations. As a result, it has now been found that the above object can be accomplished by a carbon fiber-reinforced cementitious composite composed of continuous carbon fibers and a cured cement composition comprising cement powders having an average particle size of not more than the number average diameter of the carbon fibers, where the cured cement is substantially interposed between the individual carbon fibers. In this invention the average particle size is defined as the size of particles having an integral volume of 50% by volume of the whole particles in a graph plotting integral volume of particles against particle size distribution (P in FIG. 1; Ref; *Funtai Bussai Zusetsu* (Physical Properties Explained by Diagrams), published by Nikkei Gijutsu Tosho Co., Ltd., Dec. 22, 1985 page 83).

BRIEF DESCRIPTION OF THE ACCOMPANYING DRAWINGS

FIG. 1 is a graph of particle size distribution.

FIG. 2 shows an apparatus for impregnation of carbon fibers with a cement slurry.

FIG. 3 is a cross sectional view of one embodiment of a product produced according to the present invention.

FIG. 4 is a perspective view of another embodiment of a product according to the present invention.

FIG. 5 is a resolved perspective view showing composite sheets of the present invention to be superposed.

FIG. 6 is an illustrative half cross section of one example of the composite according to the present invention.

FIG. 7 is a schematic view illustrating the load test conducted in Example 2.

DETAILED DESCRIPTION OF THE INVENTION

The term "continuous carbon fiber" as used herein means a carbon fiber which is continuous from one end of a composite to the other end.

Carbon fibers which can be used in the present invention preferably have a tensile strength of at least about 100 Kgf/mm$^2$, a tensile modulus of elasticity of at least about 10,000 Kgf/mm$^2$, and more preferably at least about 200 Kgf/mm², and about 15,000 Kgf/mm² respectively.

Carbon fibers are usually obtained from polyacrylic fiber, rayon fiber or pitch fiber. Carbon fibers are preferably manufactured using polyacrylic fibers because carbon fibers having a high tensile strength can be easily obtained. Methods for production of carbon fibers are disclosed, for example, in U.S. Pat. Nos. 4,073,870, 4,069,297, 4,197,279 and 4,543,241.

Carbon fibers usually have an average diameter of from about 1 to 20 μm, and preferably, from about 4 to 15 μm. In the present invention carbon fibers are preferably used in the form of a bundle containing from about 100 to 100,000 filaments. Carbon fibers may also be used in the form of cloth which is not woven too tightly (cloth preferably of not more than 200 g/m²).

The content of carbon fibers in the composite of the present invention is preferably from about 5 to 30% by volume based on the total volume of fibers and raw cement composition (including admixtures and water).

If the carbon fiber content is less than about 5% by volume, the cured cement composition on drying tends to undergoes internal cracking.

When the composite of the present invention is heated in a flame, etc., the cured cement composition present between carbon fibers undergoes internal stress causing cracks due to thermal expansion, contraction on dehydration, or the like. Nevertheless, since the carbon fibers have high elasticity and also a coefficient of thermal expansion of from about 0 to $-0.1 \times 10^{-6}/°C$., i.e., slightly biased on the contraction side, if the carbon fibers are continuous and are uniformly dispersed in the composite in an amount of at least 5% by volume, cracking can be suppressed much as if the composite were held by retainer bands microscopically or macroscopically to thereby maintain its strength. If the carbon fiber content is less than about 5%, such an effect is insufficient.

The more preferred content of the carbon fibers is more than about 10% by volume, and the most preferred content is more than about 20% by volume. When the content is more than 30% by volume the gaps between carbon fibers become too small to be filled with cement particles, resulting in insufficient bonding of the fibers and production of a composite having lowered qualities. Since the composite according to the present invention may contain such continuous carbon fibers in a high proportion of from about 5 to 30% by volume, they exhibit markedly increased strength.

The cement which is used in the present invention has an average particle size not larger than the average diameter of the carbon fibers. It is preferred that the average particle size not be larger than about 70% of the average diameter of carbon fibers when the content of carbon fibers is from about 10 to 20% by volume, and that the average particle size not be larger than about 60% of the average diameter of carbon fibers when the content of carbon fibers is higher than about 20% of volume.

The average particle size of the powder is preferably not less than about 1/10, and most preferably not less than about 1/5 of the average diameter of the carbon fibers.

In the present invention it is preferred to use a cement composition containing a larger average particle size and a cement powder having a smaller average particle size which is preferably of from about 1/10 to 1/100 of the larger average particle size, in combination. Particles of the smaller size preferably have a particle size within the range of from about 2 to 0.01 μm and a specific surface area (measured by the B.E.T method using nitrogen gas) of from about 15 to 45 m²/g. The content of the particles having a smaller average particle size if preferably from about 5 to 30% by weight based on the total weight of the cement (excluding that of the smaller average particle size). The tensile strain of a composite having such components is 1.5 to 2 times that of the composite containing no such fine particles.

The cement which is used in the cement composition in the present invention includes a hydraulic inorganic fine powder and a mixture of such a powder with a cement having latent hydraulic properties.

Examples of cements which can be used in the cement composition of the present invention include portland cement, alumina cement, sulfate resisting cement, blast furnace cement, mixtures thereof, and mixtures of such cement with a cements having latent hydraulic properties, such as ultrafine silica particles (which are so called silica fume or silica dust).

Since the cement powders used in the present invention have an average particle size no larger than the diameter of the carbon fibers, the cured composition can sufficiently fill the gaps between the carbon fibers and strongly bind the individual carbon fibers upon curing to ensure the strength of the composite.

Microscopic straightness of the carbon fibers and individual dispersibility of fibers can be assured in the present invention even if a large volume of carbon fibers is unidirectionally oriented in the composite.

Carbon fibers are weak on flexing due to their high modulus of elasticity. Therefore, the larger the size of the particles in a slurry of cement used for continuous impregnation into fiber bundles, in one of the methods according to the present invention hereinafter described, the larger the chance that the carbon fiber will flex upon contact with such particles. When a large volume of carbon fibers is present, the larger the particles, the higher the force required to move the particles, resulting in breakage of the fiber. If a part of the fibers in a carbon fiber bundle is broken, the broken short fibers become attached to guides (e.g., rollers) of an impregnating machine to cause breaks in other fibers of the bundle in succession, finally leading to breakage of the whole bundle. In contrast, the present invention makes it possible to continuously impregnate carbon fiber bundles with a slurry of a cement composition at an industrially practical rate without difficulty by using, as a matrix, cement powders having a smaller average particle size than the average diameter of the carbon fibers.

The proportion of the cement particles having a particle size larger than the average diameter of the carbon fiber in the total cement preferably does not exceed about 30% by volume.

If the proportion of large cement particles exceeds about 30%, the fibers flex upon impregnation of the cement slurry. The flexing force on the carbon fibers breaks a part of the carbon fibers in the bundle and ultimately causes breakage of the whole bundle of the carbon fibers as described above, thus making it impossible to carry out impregnation continuously. More preferably, the proportion of the large particles is controlled so as not to exceed about 20% when the carbon fiber content is between about 10% and 20% by volume, and not to exceed about 10% when the carbon fiber content is more than about 20% by volume.

Cases are on record where a filament winding technique or pull-pressing technique succeeded in obtaining a cured product containing about 10% by volume of carbon fibers, but the reports are not detailed enough with respect to compositions and methods. The conventional techniques are believed to encounter difficulty in carrying out continuous impregnation due to breakage of carbon fibers during the impregnation.

On the other hand, when the cement contains too large a proportion of fine particles, a higher water content is required for kneading. As a result, contraction on drying after curing increases to reduce the dynamic characteristics of the matrix. Therefore, it is preferably that the average particle size of the cement should fall within a range of from about 10 to 100% of the diameter of the carbon fibers.

Although the conventional techniques also employ fine cement particles, the average particle size of the cement particles conventionally used is several tens of micrometers. It has been, therefore, difficult to produce composite containing carbon fibers in an amount of more than about 5% in a continuous system as described above without breakage of the carbon fibers. In contrast, the cement particle size according to the present invention makes it possible to increase the carbon fiber content up to about 30% by volume based on the composite.

The amount of water preferably ranges from about 20 to 60% by weight based on the total amount of the cement, and more preferably from about 30 to 50% by weight based on the total weight of the cement. If this ratio is less than 20%, the impregnating ability of the cement slurry is reduced. If it is more than about 60%, the cured cement tends to have too high volids, resulting in a reduction of strength. When the amount of water ranges from about 20 to 60%, a composite having a high tensile strain can be obtained.

The allowable tensile strength can further be increased by addition of additives for reducing contraction on drying or expanding agents.

Examples of contraction reducing agents include those mainly composed of surfactants which are preferably oily and have a low molecular weight, such as Tetraguard AS20 (trade name: manufactured by Sanyo Kasei Kogyo Co. Ltd.). The contraction reducing agent is typically used in an amount of from 1~4% by weight based on the total weight of the cement. Examples of expanding agents include a calcium sulfoaluminate type agent and a gypsum type agent. The expanding agent is usually used in an amount of from 8~10% by weight based on the total weight of the cement.

Furthermore, the allowable tensile strain can also be increased by adding a cationic or anionic acrylic polymer dispersion to the cement composition, while controlling the particle size of the cement to substantially not more than the diameter of the carbon fibers. The polymer dispersion can be added in an amount that does not impair the non-combustibility of the resulting cured composite, i.e., not more than about 3% by volume based on the composite. It has been proved that although addition of the polymer dispersion in an amount exceeding about 3% increases combustibility, the allowable strain increases as the amount of the polymer dispersion increases. The upper limit of the amount to be added is about 20% by volume. The amount of the polymer dispersion should be, therefore, determined depending on whether the desired cured composite requires non-combustibility or increased tensile strain without consideration of combustibility.

The slurry may contain further additions such as a curing accelerator, for example, calcium chloride, usually in an amount of from about 0.1 to 1% by weight based on the weight of the total amount of the cement, and a curing retardant, for example, a hydroxycarbonic acid type retardant, usually in an amount of from about 0.2 to 1% by weight based on the weight of the total amount of the cement.

It may be difficult to uniformly disperse the aforesaid ultrafine cement particles in water. In order to overcome this and also to obtain improved physical properties, such as increased strength after curing and reduced contraction on drying, a high-performance water reducing agent which reduces the necessary amount of water used for kneading may be added to disperse the system.

Examples of the high-performance water reducing agent which can be added include naphthalenesulfonic acid/formaldehyde condensates, purified lignin sulfonic acid salts or malamine sulfonic acid salts or mixtures thereof, etc. Of these, alkali or alkaline earth metal salts of naphthalenesulfonic acid/formaldehyde condensates are particularly effective. The water reducing agent is preferably used in an amount of from about 0.5 to 7% by weight based on the total amount of cement.

It should be noted that a cement slurry containing a large quantity of such a high-performance water reducing agent becomes viscous and the cement are likely to separate. Such being the case, a separation inhibitor may be employed. The separation inhibitor to be used typically includes the above-described ultrafine silica having a particle diameter of from 2 to 0.01 $\mu$m. It is preferable to add from 5 to 30% by weight of the ultrafine silica based on the cement (excluding the silica) to sufficiently prevent separation of the cement particles during impregnation. Addition of more than about 30% by weight of the ultrafine silica is unfavorable because such a large amount of the ultrafine silica rather increases the requisite amount of water for kneading. While the ultrafine silica is added for the main purpose of preventing the carbon fibers from breaking during impregnation to assure continuous production, it also is substituted with water present among cement particles to thereby ensure a binding strength between the cement particles and the carbon fibers.

If the components of the cement composition of the present invention are simply mixed, the carbon fibers are easily broken due to their high modulus of elasticity. This can be avoided by an impregnation method.

In the present invention carbon fibers are impregnated with a raw cement compositions (slurry). Impregnation is preferably conducted by dipping a carbon fiber bundle into a slurry while applying weak tension to the fibers in order to spread the fibers. Dipping may conducted at room temperature. The viscosity (at 20° C.) of the slurry is preferably from about 5 to 50 poise, and more preferably from about 20 to 30 poises in view of efficient impregnation.

It is preferred that the carbon fibers are distributed in a matrix of the cured cement, an amount such that at least about 80% of the carbon fibers in the cross section of the composite are separated from individual neighboring fibers at a distance greater than the radius of the carbon fibers.

An apparatus for the impregnation is shown in FIG. 2. In FIG. 2 a carbon fiber bundle 21 wound on a bobbin 22 is guided by guide rollers 23 and 24 into a cement slurry 25 in a bath 26. In order to make impregnation of the carbon fiber with the slurry complete, carbon fibers are spread by applying a tension to the bundle. The tension on the bundle at the entering position of the bundle to the slurry is preferably from about 10 to 100 mg/d. The tension can be controlled by selecting the number of guides, the diameter of the rollers, the dipping angle of the bundle, viscosity of the slurry, etc.

The carbon fiber bundle impregnated with the cement slurry is passed through a guide roller 27 and a squeeze roller 28 to obtain a carbon fiber bundle impregnated with a definite amount of the cement slurry. Then the bundle is wound spirally around a drum 29 in such a manner that the carbon fiber bundles are parallel to each other and contact the adjacent bundle on the drum. Winding may be conducted to form either single or plural cementitious composition layers. The thus-obtained product on the drum may be pulled off of the drum after curing to obtain a column of the cementitious composite, or the product may b cut along the axial direction in the same manner as shown in FIG. 4 and peeled off from the drum to obtain a sheet. The thus obtained column or sheet can be cut prior to or after curing.

Plural carbon fiber bundles may be dipped into the slurry simultaneously in a sheet form to obtain the composite in a sheet form. The carbon fiber sheet impregnated with a slurry may be supported by a sheet-like support immediately after impregnation in order to maintain the state of the carbon fiber sheet impregnated with the slurry. In order to reduce the formation of voids in the composite the excess water in the raw cement composition may be eliminated (retaining a necessary amount for hydration of the cement) under a reduced pressure or by pressing while the composition keeps the state of a slurry prior or after providing the support. The deletion of water can be conducted, for example, under a reduced pressure of 0.1 atm, and water may be eliminated the amount of water becomes 20% based on the amount of the cement.

The carbon fiber bundle or sheet impregnated with the slurry may be sealed with a material scarcely permeable or impermeable to moisture and having releasable properties in order to prevent evaporation of moisture from the slurry. The thus-obtained product can be preserved in an uncured state for a prescribed period of time until it is fabricated to a prescribed size and shape. The period of preservation may be controlled by adding a curing retardant for cement or preserving at a low temperature, generally, at from about from −20° to −20° C. For the same reason as state above prior to sealing, excess water in the raw cement composition may be eliminated in the same manner as described above.

Prior to curing, the sealed product is fabricated, laminated or deformed to a desired shape or structure according to the end use. The sealing material is removed prior to, during or after such processing. The shape of the sealing material may be a sheet, tube, etc. Examples of the sealing material include a synthetic resin (such as a polyethylene) and paper impregnated with silicon oil. The sealing material is selected according to the period of preservation of the uncured composite.

The uncured composite sealed with a scarcely moisture-permeable or moisture-impermeable material as "in the state of uncompleted curing". This term as used herein means that the composite contains sufficient water to permit the composite to be formed into a desired shape. The matrix of the composite in such a state undergoes breakage under a flexure stress of 100 g/cm$^2$ or less when subjected to the bending test of constructional boards as specified in JIS A1408.

FIG. 3 illustrates one embodiment of the uncured sealed product, in which an uncured composite 31 having a sheet form is sandwiched between releasable sheets 32 and 33. Sheets 32 and 33 are scarcely moisture-permeable or moisture-impermeable. These sheets suppress evaporation of water in the composite 31 so that the water content necessary for hydration of the hydraulic inorganic material can be retained. The thickness or the degree of moisture permeability of the sheet can be selected according to the desired period of preservation. Depending on the desired preservation time or preservation atmosphere, one of the upper and lower sheets, particularly the upper sheet, may be omitted.

FIG. 4 illustrates another embodiment of the sealed uncured composite of the present invention, in which the composite 41 has a cylindrical form supported by cylindrical inner sealing material 42 and outer sealing sheet 43. In this embodiment, too, one of the sealing materials may be omitted in appropriate cases. Curing of the thus obtained product occurs after removing the sealing material from the product.

Uncured composites can be cured as they are or after being deformed to obtain a desired molded product. If desired, a plurality of the sheets of uncured composite can be superposed to obtain a laminated molding taking advantage of the above-described characteristics. In FIG. 5, the upper and lower sheets 51 and 53 are unidirectionally laminated (with respect to the direction of carbon fibers 54), with the intermediate sheet 52 being crosswise laminated at an angle of 90° to thereby obtain a bidirectionally reinforced molding. In laminating, the number of lamina and the fiber direction of each lamina can be determined depending on the end use.

The thus obtained uncured product can be cured by any methods commonly employed for cement products, such as standing, pressing, and vacuum water dehydration, or a high-pressure steam curing method to form high-strength composites.

Usually, the product obtained by impregnating the cement into the fiber bundle is allowed to stand until it is hardened in such a degree that it is not deformed by finger-pressing. Then the product is subjected to, for example, the following curing method.

1) curing under sprinkling: In order to avoid drying of the surface of the composition impregnated into the carbon fiber bundle, water is applied to the composite by sprinkling during curing. The curing is conducted usually at 5° to 30° C. for 5 to 15 days.

2) Curing in water: Curing is conducted in water usually at 5° to 60° C. for 1 to 14 days.

3) Curing in steam: Curing is conducted usually at 60° to 80° C. under 100% RH for 4 to 12 hours.

4) Curing in a high humidity room: Curing is conducted usually at 5° to 30° C. under 80 to 100% RH.

The composite of the present invention usually has voids in an amount of about 0 to 20% by volume based on the volume of the composite.

FIG. 6 is a half cross-section of one example of the cured composite according to the present invention.

The composite shown in FIG. 6 can be produced using a cement composition such as that shown in Table 1 in Example 1.

In FIG. 6, the magnifications of the diameter of composite 61 and the diameters of carbon fiber 62, hydrated cement 63, and hydrated ultrafine silica 64 are chosen for convenience in explanation and are not to scale. Most of the largest circles indicate carbon fibers 62; most of the smaller circles indicate hydrated cement particles 63, with hydrated ultra fine silica 64 also shown by the smaller circles being incorporated among the hydrated larger cement particles 63.

While the composite shown in FIG. 6 has carbon fibers substantially uniformly dispersed therein when cross-sectionally observed, the carbon fibers may be concentrated to some extent in the vicinity of the periphery or in the vicinity of the center. Such a distribution of carbon fibers can be selected depending on the end use of the composite.

The above-described cement powders a having definite particle size are able to keep the fibers in a straight line and to increase the gaps between the carbon fibers, thus making it possible to increase the carbon fiber content in the composite material and to carry out impregnation in a continuous system. From these consideration, it can be seen that the limitation of the cement particle size permits incorporation of a large quantity of carbon fibers on an industrial scale while assuring straightness of the fibers microscopically, and further promotes firm and tough binding of individual carbon fibers with a hydrate of the cement powders. As a result, composites excellent in dynamic characteristics can be obtained without impairing various performance properties possessed by the carbon fibers.

The composite in accordance with the present invention is lightweight and highly strong because of firm bonding between the cured cement and carbon fibers and its high content of carbon fibers. Further, in addition to non-combustibility and fire resistance, the composites have excellent corrosion resistance, alkali resistance, self-moisture conditioning properties, moisture permeability, electromagnetic conductivity, and electromagnetic radiation shielding properties, as well as cuttability, electrical heat generating properties, and low thermal conductivity.

Hence, the composite of the present invention can be applied to a wide variety of refractories, taking advantage of their various characteristics by appropriately selecting the kind of carbon fibers, the degree of fiber orientation, and the content of carbon fibers, and obtaining a product in any desired shape according to the end use.

The composite according to the present invention may be either solid or hollow and may have any cross-sectional shape, such as a circular shape, a rectangular shape, or on irregular shape.

The composites according to the present invention are cuttable with a knife, etc., like bamboo or wood, so that they can be chipped or cut to a prescribed shape or size according to the end use.

Example of applications of the present invention include marine structures and reinforcements therefor, ships and fish preserves, bridges and piers, fuel tanks, fabricated constructional parts, roofing panels for large spaces, lightweight profiles, protective pipes for communication cables, electromagnetic radiation shielding parts, heat insulating fire resistant connectors, and transport hardware and heating elements.

More specific examples of applications of the present invention include chairs having fireproof heaters useful in places where many people gather, taking advantage of electrical heat generating properties and non-combustibility; reinforcements for various concrete products and furnace materials taking advantage of high strength, fire resistance, and corrosion resistance; various connectors, e.g., bolts, nuts, pins, etc., taking advantage of high strength, fire resistance, and low thermal conductivity; durable constructional materials, e.g., wall panels, partitioning panels, flooring, roofing panels, pipes, etc., taking advantage of electromagnetic radiation shielding properties and other characteristics; substitutes for wood, various lightweight profiles commonly made of metals, building stones, tiles, etc.; and the like.

The composite of the present invention can be used as a surface material for roofing panels or wall panels in a structure having an air conditioning system having a radiative effect. It is advantageous to use the composite as such a material because the composite has moisture permeability, high strength, low deformation due to creep, and is incombustible (it does not deform even in a fire). Since the composite has high strength, the thickness of these products can be made to be very thin. Therefore, high conduction of heat can be easily attained by using such products. The composite is especially useful in such a material because dew does not form on the material.

The composite of the present invention can be used as a reinforcement for mortar and concrete. The composite exhibits a sufficiently high affinity for mortar and concrete to be firmly bonded to mortar and concrete, while undergoing no reduction in resistance even under high temperatures.

Since the composite according to the present invention has the cement matrix thereof exposed on its surface, it bonds well to mortar or concrete thereby ensuring the reinforcing effect. The composite, mainly composed of carbon fibers and a cement hydrate bound thereto, is highly durable so that the bonding between mortar or concrete and the reinforcement is not weakened. These effects produced by the firm bonding between the composite of the invention and mortar or concrete can be further enhanced by providing an uneven surface on the composite for the purpose of increasing the bonding force.

FIG. 6 shows that a hydrate of cement powders 63 is exposed on the surface of composite 61. A part of the water content in the composite material (50.0 vol. % in the particular case of Table 1) has been utilized for hydration, and another part of the water content remains in the composite as adsorbed water.

Further, the firm bonding between the carbon fibers and the hydrate cement matrix in the reinforcement prevents the carbon fibers from flexing or being damaged on handling in field work, or being damaged by aggregates of mortar or concrete to be reinforced. In carrying out placing of mortar or concrete, it is also possible to use a rope-like composite material in the uncured state. Further, the reinforcement may have its surface roughened or may have various forms, such as a curved form.

The composite of the present invention can be used as a formwork for placing concrete for production of a pillar or a beam. The thus obtained products have a double construction reinforced by a composite of the present invention.

EXAMPLE 1

TABLE 1

| | Component | Weight Ratio (wt %) |
|---|---|---|
| Cement Composition (Matrix) | Ultrafine blast furnace slag type cement[1] | 43.3 |
| | Ultrafine silica powder (diameters destribute from 2 to 0.1 μm; average diameter: 0.38 μm.) | 8.7 |
| | Highly condensed naphthalene-sulfonate/formaldehyde (Mighty; trade name, manufactured by KaO Sekken Co., Ltd.) | 1.0 |
| | Water | 27.0 |
| Reinforcement: | Carbon fibers (diameter: 7 μm) | 20.0[2] |

Note:
[1] The cement contains particles having a diameter greater than 7 μm (the diameter of the carbon fibers), in a proportion of 10% by volume, with the maximum particle size being 10 μm.
[2] The unhardened composition of the Table weighed 1.77 Kgf/l. Since the carbon fibers weighed 1.77 Kg/l, the volume ratio of the carbon fibers in the uncured composition was also 20%.

A cement slurry (matrix mixture) having the composition shown in Table 1 was prepared by using "Nittetsu Superfine" produced by Nittetsu Cement K.K.) an ultrafine blast furnace cement, and ultrafine silica obtained by deletion of coarse particles from "Pozzomix P" produced by Union Kasei K.K. A carbon fiber bundle comprising 6,000 filaments (each having a diameter of 7 μm), having a tensile strength of 405 Kgf/mm$^2$ and a modulus of elasticity of 25,000 Kg/mm$^2$ was continuously dipped in the cement slurry under a tension of 20 mg/d at a rate of 10 m/min and at room temperature (about 20° C.). After being squeezed by a guide bar, the carbon fiber bundle impregnated with the cement slurry was wound spirally around a drum 0.4 m in diameter in such a manner that the individual carbon fiber bundles were oriented parallel with each other and in contact with the adjacent bundle on the drum. The resulting web material was cut along the drum in the axial direction as shown in FIG. 4 to obtain a unidirectionally-oriented cement slurry-impregnated sheet 1,200(L)×500(W)×0.7(T) mm in size. (L: length in the direction of carbon fiber bundle, W: width, i.e., length in the direction perpendicular to the direction of the bundle, T: thickness).

The thus obtained sheet was soft and was found upon examination to have the cement slurry impregnated uniformly into the gaps among the carbon fibers and to have the fibers oriented substantially unidirectionally.

Sixteen sheets obtained as described above were unidirectionally (with respect to the orientation of the fiber bundle) superposed and pressed in a frame of 10(W)×10(T)×1,000(L) mm in size to prepare a test specimen (of this size) for strength determination. A test specimen for determining thermal conductivity was prepared in the same manner except for using 17 sheets and a frame of 50(T)×100(W)×200(L) mm in size.

The frame packed with the laminate was allowed to stand at 20° C. for 24 hours in an atmosphere preventing evaporation of the water content, immersed in warm water at 50° C. for 48 hours, and then allowed to stand in a room (at about 20° C.) for 4 weeks.

The performance of the resulting cured product is described in Table 2 below. Further, a schematic drawing based on a scanning electron micrograph of a cross-section of the product is shown in FIG. 6.

TABLE 2

| Flexural Strength | (ASTM D-790) | 33 Kgf/mm$^2$ |
|---|---|---|
| Tensile Strength | (ASTM D-3039) | 56 Kgf/mm$^2$ |
| Flexure Modulus Elasticity | (ASTM D-790) | 5,100 Kgf/mm$^2$ |
| Tensile Modulus Elasticity | (ASTM D-3039) | 5,000 Kgf/mm$^2$ |
| Thermal Conductivity* | | |
| Length direction: | | 1.2 kcal/mhr °C.** |
| Diameter direction: | | 0.8 kcal/mhr °C. |
| Specific Gravity (20° C., RH 60%) | | 1.7 |
| Carbon Fiber Content | | 20% by volume |

*Using non-steady method. Measured with a rapid thermal conductivity meter, "Shotherm QTM" manufactured by Showa Denko K.K.
**hr:hour

EXAMPLE 2

Cement slurry-impregnated carbon fiber sheets were prepared in the same manner as described in Example 1, except for cutting the web material into sheets of 500(L)×500(W)×0.7(T) mm in size.

The resulting composite laminate was soft and found to have the cement slurry impregnated uniformly into the gaps among the carbon fibers and to have the fibers oriented substantially unidirectionally.

Three of the sheets immediately after production were superposed in a frame with the upper and the lower sheets being unidirectionally laminated and the intermediate sheet being crosswise (at 90°) laminated tightly, as shown in FIG. 5.

The laminate was placed on a flat plate and cured in the same manner as in Example 1 to obtain a refractory panel. The resulting panel was cut into a test specimen 280(L)×20(W)×2(T) mm in size in such a manner that the fiber direction of the upper and lower sheets was the lengthwise direction. The specimen 71 was mounted on a simple beam for a load test as shown in FIG. 7, with a load of 1.5 Kgf on two trisecting points so as to apply a flexure stress of 450 Kgf/cm$^2$. The specimen was then heated by means of a gas burner 72 placed below the center of the specimen for 20 minutes. The heating temperature was about 1,000° C. at a position about 5 mm below the center of the specimen.

For comparison, a specimen made of common steel of the same dimensions was heated under the same conditions.

The temperatures of both the refractory specimen and the common steel specimen were approximately 700° C. as determined by a K thermocouple attached to the center of the upper sheet (the side opposite to the heated side) with a water glass type heat-resistant adhesive. During the heating, both of the specimens glowed red hot.

The specimen of the present invention initially deflected about 0.5 mm with the load of 1.5 Kgf because of its smaller modulus of elasticity than common steel. The deflection of the specimen after two minutes heating was about 5 mm, and that after 20 minutes heating was not more than 6 mm. When the heating was stopped, the deflection rapidly decreased to about 1 mm, and the residual deflection after removal of the load was almost zero.

In contrast, the deflection of the common steel specimen with the load of 1.5 Kgf on its was initially was about 0.1 mm but gradually increased as the heating went on, and the deflection was 25 mm-plus after 20 minutes. Thereafter, the heating was stopped and the load was removed, but the deflection remained as a permanent set.

It can be seen from these results that the high-strength composites according to the present invention do not suffer a great reduction in load-bearing properties when heated at high temperatures, and exhibit excellent heat resistance and fire resistance.

EXAMPLE 3

The same set was carried out as in Example 2 on specimens prepared in the same manner as Example 2, except for replacing the ultrafine blast furnace cement with common portland cement having an average particle size of 6 μm, alumina cement having an average particle size of 7 μm or sulfate resisting cement having an average particle size of 6 μm. When similarly tested, all the specimens exhibited excellent fire resistance similarly to the specimen using ultrafine blast furnace cement.

In summary, although not desiring to be bound by theory, it is believed that the superior fire resistance of the composite according to the present invention as compared with common steel is ascribable to the following reasons:
1) The carbon fibers loaded in the composite are excellent in fire resistance and free from substantial change in physical properties even when heated up to around 2,000° C. in an oxygen-free atmosphere.
2) In the present invention, the aforesaid carbon fibers are covered with a cured element to be substantially protected from oxygen.
3) The aforesaid cured cement is likely to undergo thermal expansion on heating or contraction on dehydration to cause cracks, leading to a loss of its function as a matrix. Nevertheless, since the composite of the present invention has uniformly incorporated therein a large quantity of continuous carbon fibers having a high modulus of elasticity and a thermal expansion coefficient of $-0.1 \times 10^{-6}/°C.$, which means that they are slightly contracted when heated to high temperatures, the matrix of cured cement is prevented from continuously cracking either macroscopically or microscopically, thus maintaining its strength as a whole.

EXAMPLE 4

A cured composite was produced in the same manner as in Example 1 except having the composition shown in Table 3, using a dipping rate of 12 m/min and using a frame 10(T)×10(W)×300(L) mm in size.

TABLE 3

| | Component | wt % | vol % |
|---|---|---|---|
| Cement Composition: | Ultrafine blast furnace cement (the same as in Example 1) | 47.0 | 27.5 |
| | Ultrafine silica (the same as in Example 1) | 9.1 | 6.0 |
| | High condensate of a naphthalene sulfonate/formaldehyde condensate | 0.9 | 1.5 |
| | Water | 28.0 | 50.0 |
| Reinforcement: | Carbon fibers (diameter: 7 μm, tensile strength: 310 Kgf/mm², modules of elasticity 26,000 Kgf/mm², 6,000 filaments) | 15.0 | 15.0 |

The performance of the cured product thus obtained is shown in Table 4.

TABLE 4

| Flexural Strength | (ASTM D-790) | 20 Kgf/mm² |
|---|---|---|
| Tensile Strength | (ASTM D-3039) | 15 Kgf/mm² |
| Flexure Modulus of Elasticity | (ASTM D-790) | 3,000 Kgf/mm² |
| Specific Gravity | (20° C., RH 60%) | 1.7 |
| Carbon Fiber Content | | 15% by volume |

EXAMPLE 5

In order to determine the relationship between particle sizes of cement powders and the rate of impregnation of the cement slurry into carbon fibers, the cement slurry having the composition and a cement slurry having the same composition as in Table 3 except for replacing the ultrafine blast furnace cement (average particle size: 4 μm) with common portland cement having an average particle size of about 30 μm (trade name: "Onoda Cement; produced by Onoda Cement Co., Ltd.) were prepared.

A carbon fiber bundle (the same as used in Example 4) was continuously introduced into each of the slurries while being guided successively with a ceramic eyelet and a ceramic roll. The fiber bundle was impregnated with a slurry while passing through rollers placed in a slurry bath and then taken out while controlling the amount of the slurry impregnated by means of four ceramic bars. During the impregnation, the carbon fiber bundle was under a tension of 20 mg/d at a varied rate of pulling. A rate of pulling at which 1,000 m or more of the fiber bundle could run continuously and stably without being accompanied by adhesion of short cut fibers to the guides of the impregnating machine was determined and taken as the rate at which continuous impregnation could be carried out.

The results obtained are shown in Table 5 below.

TABLE 5

| Average Particle size of Cement Powders (μm) | Rate of Pulling for Continuous Impregnation (m/min) |
|---|---|
| 3.2 | 50 |
| 24 | 3 |

As can be seen from the Table, in the production of a cured composite containing 15% by volume of carbon fibers, the rate of continuous impregnation can be markedly increased by keeping the average particle size of the cement powders below the average diameter of the carbon fibers.

EXAMPLE 6

A cement slurry having the same composition as in Table 3, except for the further addition of a retarder (trade name: Paric T; produced by Fujisawa Pharmaceutical Co., Ltd.) in an amount of 1% by weight based on the ultrafine blast furnace cement, was prepared. A carbon fiber bundle (the same as used in Example 4) was processed in the same manner as Example 1 to obtain uncured composites 1,200(L)×500(W)×0.8(T) mm in size.

The resulting sheets were soft and were found to have the cement slurry impregnated uniformly into gaps among the carbon fibers and to have the fibers oriented substantially unidirectionally.

Each of the sheets was sandwiched between polyethylene sheets, and all the edges of the sheets were sealed, followed by freezing at −20° C. After storage for 7 days, the sheets were left to thaw at room temperature.

Immediately after removing the polyethylene sheets, thirteen sheets were unidirectionally laminated under a pressure of about 1 Kg/cm$^2$, for about 12 hr. to have a total thickness of 10 mm. The resulting laminate was wrapped in a polyethylene sheet so as to prevent evaporation of water content, and allowed to stand at 20° C. for 24 hours, immersed in warm water at 50° C. for 48 hours, and then allowed to stand at a room temperature for 1 week.

The properties of the resulting cured composite (I) are shown in Table 6 below. For reference, the properties of a cured composite (II) prepared in the same manner as described above, for the freezing, preserving and thawing of the sheet, are also shown in Table 6.

TABLE 6

| Property | Composite (I) | Composite (II) |
| --- | --- | --- |
| Flexural Strength (ASTM D-790) 17 Kgf/mm$^2$ | 18 Kgf/mm$^2$ | |
| Tensile strength (ASTM D-3039) | 16 Kgf/mm$^2$ | 16 Kgf/mm$^2$ |
| Flexure Modulus Elasticity (ASTM D-3039) | 3,000 Kgf/mm$^2$ | 3,000 Kgf/mm$^2$ |
| Specific Gravity (at 20° C., RH 60%) | 1.7 | 1.7 |
| Carbon Fiber Content | 15 vol % | 15 vol % |

It can be seen from the results of Table 6 that Composite (I) exhibited no substantial change in properties despite storage while frozen.

For comparison, a cement slurry was prepared in the same manner as described hereinabove in this Example, except for replacing the ultrafine blast furnace cement with common portland cement having an average particle size of 30 μm. When continuous impregnation of a carbon fiber bundle was carried out in the same manner as above but using the comparative cement slurry, breakage of the fiber bundle sometimes occurred due to breakage of single fibers, making it difficult to achieve stable impregnation.

EXAMPLE 7

Uncured composition 1,200(L)×500(W)×0.8(T) mm in size were obtained in the same manner as in Example 1 except using the components of Table 3 and a dipping rate of 50 m/min. After curing the product in the same manner as in Example 1, the product was further cured in high-pressure steam at 180° C. for 7 hours.

The performance of the cured composite thus obtained are shown in Table 7.

TABLE 7

| Flexural Strength | (ASTM D-790) | 22 Kgf/mm$^2$ |
| --- | --- | --- |
| Tensile Strength | (ASTM D-3039) | 19 Kgf/mm$^2$ |
| Flexure Modulus Elasticity | (ASTM D-790) | 3,400 Kgf/mm$^2$ |
| Specific Gravity | (20° C., RH 60%) | 1.7 |
| Carbon Fiber Content | | 15% by volume |

EXAMPLE 8

A cement slurry having the composition shown in Table 3 was prepared. A carbon fiber bundle (the same as in Example 4) was continuously dipped in the cement slurry under a tension of 20 mg/d to thereby obtain a fiber bundle having the slurry impregnated into the gaps among the carbon fibers. Fifty-one bundles thus obtained were placed in an acrylic resin tube having an inner diameter of 10 mm and a length of 1 m and allowed to stand at 20° C. for 24 hours and then immersed in warm water at 50° C. for 48 hours. The fiber bundle structure was taken out of the tube, allowed to stand at room temperature for 1 week, and then subjected to high-pressure steam curing at 180° C. for 7 hours to substantially completely cure them. The resulting molded product was found to have the continuous fibers unidirectionally oriented and to have a hydrate of the hydraulic inorganic fine powders filled in the gaps between the carbon fibers.

The surface of the molded product was roughened with sandpaper to obtain a test specimen according to ASTM C234-62 (reinforced concrete test method). For comparison, a steel bar having the same diameter as the above prepared specimen was used. The concrete used in the test had a compressive strength of 290 Kgf/cm$^2$. The adhesion stress of the comparative specimen was 32 Kgf/mm$^2$, while that of the reinforcing bar according to the present invention was found to be 10% higher, indicating satisfactory adhesion to concrete. The tensile strength of the reinforcing bar of the invention was 1,900 Kgf/mm$^2$.

EXAMPLE 9

A cured composite was produced in the same manner as in Example 1 except having the composition shown in Table 8, using a dipping rate of 6 m/min and using a frame 10(T)×10(W) ×300(L) mm in size.

TABLE 8

| | Component | wt % | vol % |
| --- | --- | --- | --- |
| Cement Composition: | Ultrafine blast furnace cement (the same as in Example 1) | 53.7 | 34.9 |
| | Ultrafine silica (the same as in Example 1) | 10.8 | 7.9 |
| | High condensate of a naphthalene sulfonate/formaldehyde condensate | 1.6 | 2.1 |
| | Water | 21.5 | 41.6 |
| Reinforcement: | Carbon fibers (diameter: 7 μm, tensile strength: 38.5 Kgf/mm$^2$, modules of elasticity 26,000 Kgf/mm$^2$, 12,000 filaments) | 12.4 | 13.5 |

The performance of the cured product thus obtained is shown in Table 9.

TABLE 9

| Flexural Strength | (ASTM D-790) | 40 Kgf/mm$^2$ |
| --- | --- | --- |
| Tensile Strength | (ASTM D-3039) | 38 Kgf/mm$^2$ |
| Flexure Modulus of Elasticity | (ASTM D-790) | 5,500 Kgf/mm$^2$ |
| Specific Gravity | (20° C., RH 60%) | 1.8 |
| Carbon Fiber Content | | 13.5% by volume |

While the invention has been described in detail and with reference to specific embodiments thereof, it will be apparent to one skilled in the art that various changes and modifications can be made therein without departing from the spirit and scope thereof.

What is claimed is:

1. A carbon fiber-reinforced cementitious composite comprising (1) unidirectionally oriented continuous carbon fibers and (2) a cured cement composition which comprises (a) larger cement particles having an average particle size not less than 1/10 of and not more than the average diameter of the carbon fibers, and (b) smaller cement particles having an average particle size of from 1/10 to 1/100 of the average size of the larger cement particles, said smaller cement particles being incorporated in an amount of from 5 to 30% by weight of the amount of the larger cement particles, said cured cement composition being substantially interposed between the individual carbon fibers by impregnation, and said carbon fibers being present in an amount of at least 5% of the total volume of the raw composition for the composite, wherein said carbon fibers are present in an amount of up to 30% of the total volume of the raw composition for the composite and wherein said cement contains no more than 30% by volume based on the total volume of the cement of cement particles having a particle size larger than the average diameter of the carbon fibers.

2. A carbon fiber-reinforced cementitious composite as in claim 1, wherein said carbon fibers have a tensile strength of at least 100 Kgf/mm$^2$.

3. A carbon fiber-reinforced cementitious composite as in claim 1, wherein said carbon fibers have a modulus of elasticity of at least 10,000 Kgf/mm$^2$.

4. A carbon fiber-reinforced cementitious composite as in claim 1, wherein said carbon fibers have an average diameter of from 1 to 20 μm.

5. A carbon fiber-reinforced cementitious composite as in claim 1, wherein the carbon fibers are present in an amount up to 10% of the total volume of the raw composition for the composite.

6. A carbon fiber-reinforced cementitious composite as in claim 1, wherein the carbon fibers are present in an amount of from 10 to 20% of the total volume of the raw composition for the composite for the composite and the cement contains up to 20% by volume based on the total volume of the cement of cement particles having a particle size larger than the average diameter of the carbon fibers.

7. A carbon fiber-reinforced cementitious composite as in claim 1, wherein the carbon fibers are present in an amount greater than 20% of the total volume of the raw composition for the composite and the cement contains up to 10% by volume based on the total volume of the cement of cement particles having a particle size larger than the average diameter of the carbon fibers.

8. A carbon fiber-reinforced cementitious composite as in claim 1, wherein the carbon fibers are present in an amount of from 10 to 20% of the total volume of the raw composition for the composite and the total of the cement particles present in the cement have a particle size no more than 70% of the average diameter of the carbon fibers.

9. A carbon fiber-reinforced cementitious composite as in claim 1, wherein the carbon fibers are present in an amount than 20% of the total volume of the raw composition for the composite and the total of the cement particles present in the cement have an average particle size no more than 60% of the average diameter of the carbon fibers.

10. A carbon fiber-reinforced cementitious composite as in claim 1, wherein said smaller cement particles have a particle size within the range of from 0.01 to 2 μm and have a surface area within the range of from 15 to 45 m$^2$/g.

11. A carbon fiber-reinforced cementitious composite as in claim 1, wherein said cement comprises hydraulic inorganic fine powders.

12. A carbon fiber-reinforced cementitious composite as in claim 11, wherein said cement further comprises a cement having latent hydraulic properties.

13. A carbon fiber-reinforced cementitious composite in claim 11, wherein said hydraulic inorganic fine powders are selected from the group consisting of portland cement, blast furnace cement, alumina cement, sulfate resisting cement, and a mixture thereof.

14. A carbon fiber-reinforced cementitious composite as in claim 12, wherein said cement having latent hydraulic properties comprises ultrafine silica particles.

15. A carbon fiber-reinforced cementitious composite as in claim 1, wherein the amount of water is from 20 to 60% by weight based on the total amount of the raw cement used for the composite.

16. A carbon fiber-reinforced cementitious composite as in claim 1, wherein the raw cement composition used for the composite contains at least one of a high-performance water reducing agent, a contraction reducing agent, an expanding agent, a cationic or anionic acrylic polymer, dispersion capable of increasing the tensile strain of the composite, a curing accelerator, and a curing retardant.

17. A carbon fiber-reinforced cementitious composite as in claim 1, wherein said carbon fibers are distributed in the composite such in a cross section that at least 80% of the carbon fibers are from neighboring fibers by a distance at least equal to the a radius of the carbon fibers.

18. A carbon fiber-reinforced cementitious composite as in claim 1, wherein said composite has a void in an amount 0 to 20% by volume based on the volume of the composite.

19. A carbon fiber-reinforced cementitious composite as in claim 1, wherein said carbon fibers have an average diameter of from 4 to 15 μm.

20. A carbon fiber-reinforced cementitious composite as in claim 1, wherein said composite contains at least 100 filaments.

21. A carbon fiber-reinforced cementitious composite as in claim 1, wherein said composite contains carbon fibers in an amount of at least 10% of the total volume of the raw composition for the composite.

* * * * *